United States Patent [19]

Heesch

[11] Patent Number: 4,657,125

[45] Date of Patent: Apr. 14, 1987

[54] SINGLE-SPRING CLUTCH MECHANISM

[75] Inventor: Max O. Heesch, Ypsilanti, Mich.

[73] Assignee: ITT Corporation, New York, N.Y.

[21] Appl. No.: 796,978

[22] Filed: Nov. 12, 1985

[51] Int. Cl.$^4$ ............................................. F16D 11/06
[52] U.S. Cl. .................................... 192/41 S; 192/43; 192/81 R
[58] Field of Search ...................... 192/43, 41 S, 81 C, 192/81 R, 80, 12 BA, 17 D

[56] References Cited

U.S. PATENT DOCUMENTS 4,372,432  2/1983  Waine et al. ....................... 192/43 X
4,573,738  3/1986  Heesch ................................ 297/362

Primary Examiner—Carl D. Friedman
Attorney, Agent, or Firm—James B. Raden; Donald J. Breh

[57] ABSTRACT

A single spring clutch mechanism is disclosed providing for equal holding power in opposite directions of application of torsional forces thereto. The clutch includes a single torsional spring mounted for always being in tension regardless of the direction of application of torsional forces. The clutch provides for infinite angular positioning and retention of a member controlled by the clutch and is particularly adapted for use in an automotive reclining seat mechanism.

9 Claims, 6 Drawing Figures

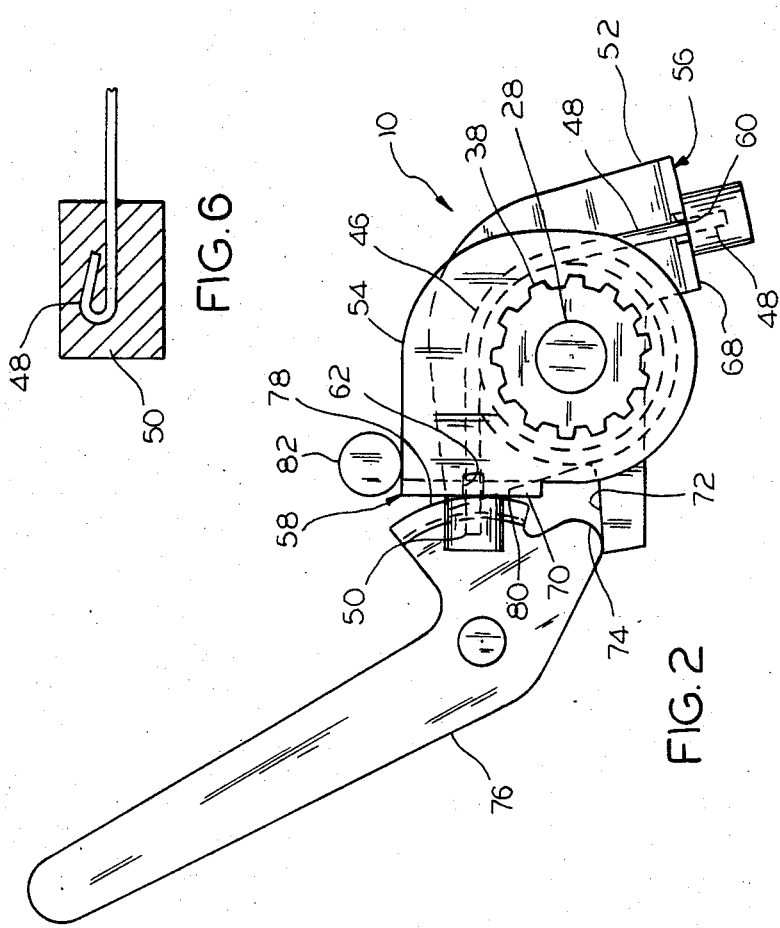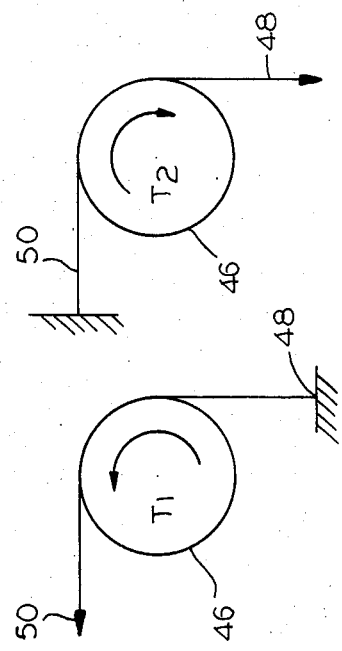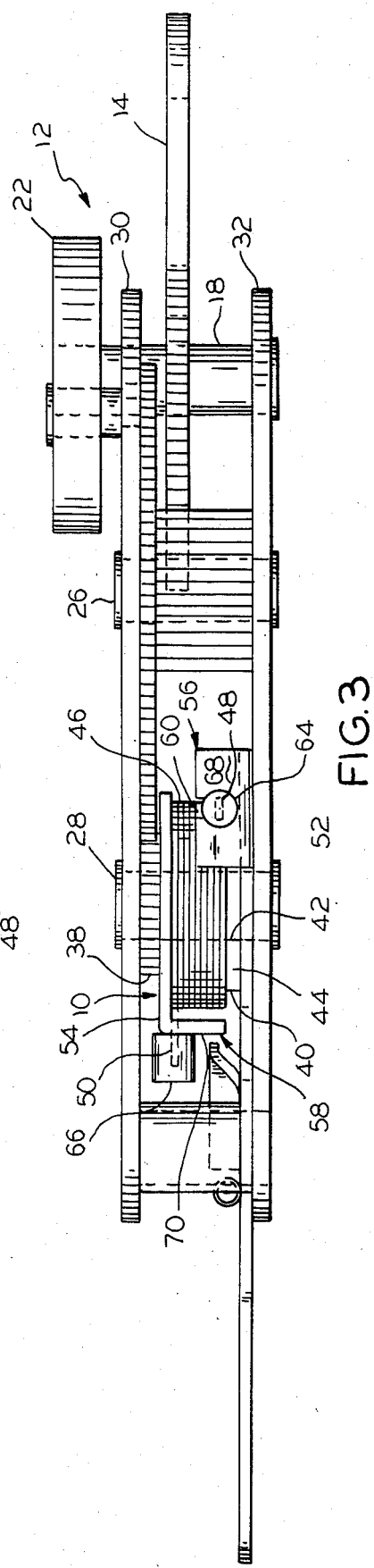

4,657,125

SINGLE-SPRING CLUTCH MECHANISM

BACKGROUND OF THE INVENTION

This invention relates to clutch mechanisms. More particularly, the invention relates to a clutch mechanism of the type employing a torsion spring adapted to frictionally engage and disengage a rotating spindle. The invention is particularly applicable for use wherein controlling the angular position of a pivotable member is required, such as an automotive reclining seat back.

In the field of reclining seats, it is highly desirable to provide for adjustment and retention of the seat back at any of an infinite number of angular positions between the extreme upright and reclined positions. Further, it is well known that automotive seat backs are subjected to very high forces in use, particularly in regard to rearwardly directed forces due to, for example, inertial forces developed in vehicle rear end impacts as well as user initiated forces.

Heretofore, infinitely adjustable clutch mechanisms have not been totally acceptable for automotive reclining seat applications for at least two principle reasons. First, although spring clutches have been devised that provide infinite angular positioning, such as that disclosed in my U.S. Pat. No. 4,573,738, they have required the use of two oppositely wound tandum springs so that loads imposed thereon in opposite directions of rotation may be equally absorbed. This has been the case because single spring clutches have heretofore offered high frictional holding power in only one direction of application of force. Prior to the present invention, spring clutches have had less holding power when forces are applied in the direction which tends to unwind the spring coil because the spring is caused to unload. This is true because the principle of operation of a spring clutch demands that one end of the spring coil must be fixed against movement and the opposite end of the spring coil must be free to move so as to allow the coil of the spring to always be in tension under the influence of the particular external force imposed thereon, thereby preventing the spring coil from buckling and unloading.

Heretofore, there has been no structure devised for selectively fixing the ends of the spring coil so as to provide for the required movement and affixation depending on the direction of application of the external force thereon so as to maintain the spring coil in tension regardless of the direction of application of the external force.

To overcome this shortcoming, two torsion coil springs, either wound in opposite directions or mounted with their windings orientated in opposite directions, have been employed so that one spring aborbs forces in one direction and the second spring aborbs the forces in the opposite direction. While these structures provide for equal holding power regardless of the direction of application of the external force, they require an additional clutch spring and related components which is not cost or space efficient.

It can, therefore, be appreciated that it would be highly desirable to provide for a single torsion spring clutch mechanism that provides for equal holding power in each of opposite directions of rotation of a spindle under the influence of externally applied forces on a pivotable member such as a reclining seat back which is connected to the spindle and which further provides for infinite angular adjustment and retention of the member at all locations between its extreme angular positions.

SUMMARY OF THE INVENTION

The present invention overcomes the shortcomings of the prior art by providing a single torsion-type coil spring clutch that has equal frictional holding power on a spindle which is mounted within the spring coil for rotation in opposite directions in response to the pivotal movement of an external member.

According to a preferred aspect of the invention, the clutch mechanism is provided with means for maintaining the spring coil in tension regardless of the direction of application of external forces thereon.

According to a very important feature of the invention, the clutch mechanism includes a pair of spring plates on opposite sides of the spring coil which are provided with means for attaching one free end of the spring coil to each spring plate.

Another important feature of the invention provides for the means for attaching the spring ends to the spring plates to also provide for movement of one spring end and retention of the second spring end under the influence of a torsional force exerted on the spring in one direction when engaged to the spindle and, conversely, to provide for movement of the second spring end and retention of the first spring end under the influence of a second torsional force exerted on the spring in a direction opposite to the direction of the first torsional force.

According to another feature of the invention, the retention of the spring ends is achieved by providing a slot in each spring plate in which a respective one of the spring ends is slidably received. An enlarged portion on each spring end is engaged against the spring plate allowing movement in the slot in one direction only.

A still further important feature of the invention provides for one spring plate to include two cam surfaces selectively contacted by a lever-operated cam actuator. In a released position of the lever, the acutator contacts a first cam surface and rotates the one spring plate in a direction for unwinding the spring coil providing for reduction in spring tension and disengagement from the spindle. Simultaneously, the other spring plate, and spring end attached thereto, is restrained by a first stop member engaged against the other spring plate.

Another feature of the invention provides for the cam actuator to contact the second cam surface on the one spring plate in an engaged position of the lever thereby rotating the one spring plate and coil spring in a direction for increasing the tension of the spring and causing engagement with the spindle. Simultaneously, a second stop contacts the other spring plate again restraining it and the spring end attached thereto against rotation.

A still further important feature of the invention provides for the cam actuator to define a third stop member for also restraining the one spring plate against rotation in the engaged position of the lever.

The cooperating spring plates, including the spring end retention means, cam surfaces, stop members, and lever-operated cam actuator provide for maintaining the torsion spring in tension regardless of the direction of application of external forces on the spindle and also provides for infinite adjustment of the angular positioning of the external member which is controlled by the clutch mechanism.

BRIEF DESCRIPTION OF THE DRAWINGS

The advantages and features of the invention will be better understood after a reading of the following Detailed Description Of The Preferred Embodiment taken in conjunction with the drawings of which:

FIG. 2 is a side elevation of the clutch mechanism of the invention showing details of construction and operation in the released position of the clutch;

FIG. 3 is a top view of the reclining seat assembly of FIGS. 1 and 2 showing further details of construction and operation of the clutch mechanism of the present invention;

FIG. 4 is a diagramatic representation of the principle of operation of the clutch mechanism of the present invention in a first direction of operation; and FIG. 5 is a diagramatic representation of the principle of operation of the clutch mechanism of the present invention in a second direction of operation;

FIG. 6 is a partial cross-sectional view of one end of the clutch springs showing details of attachment of an enlargement.

DETAILED DESCRIPTION OF THE PREFERRED EMBODIMENT

Figure 1:
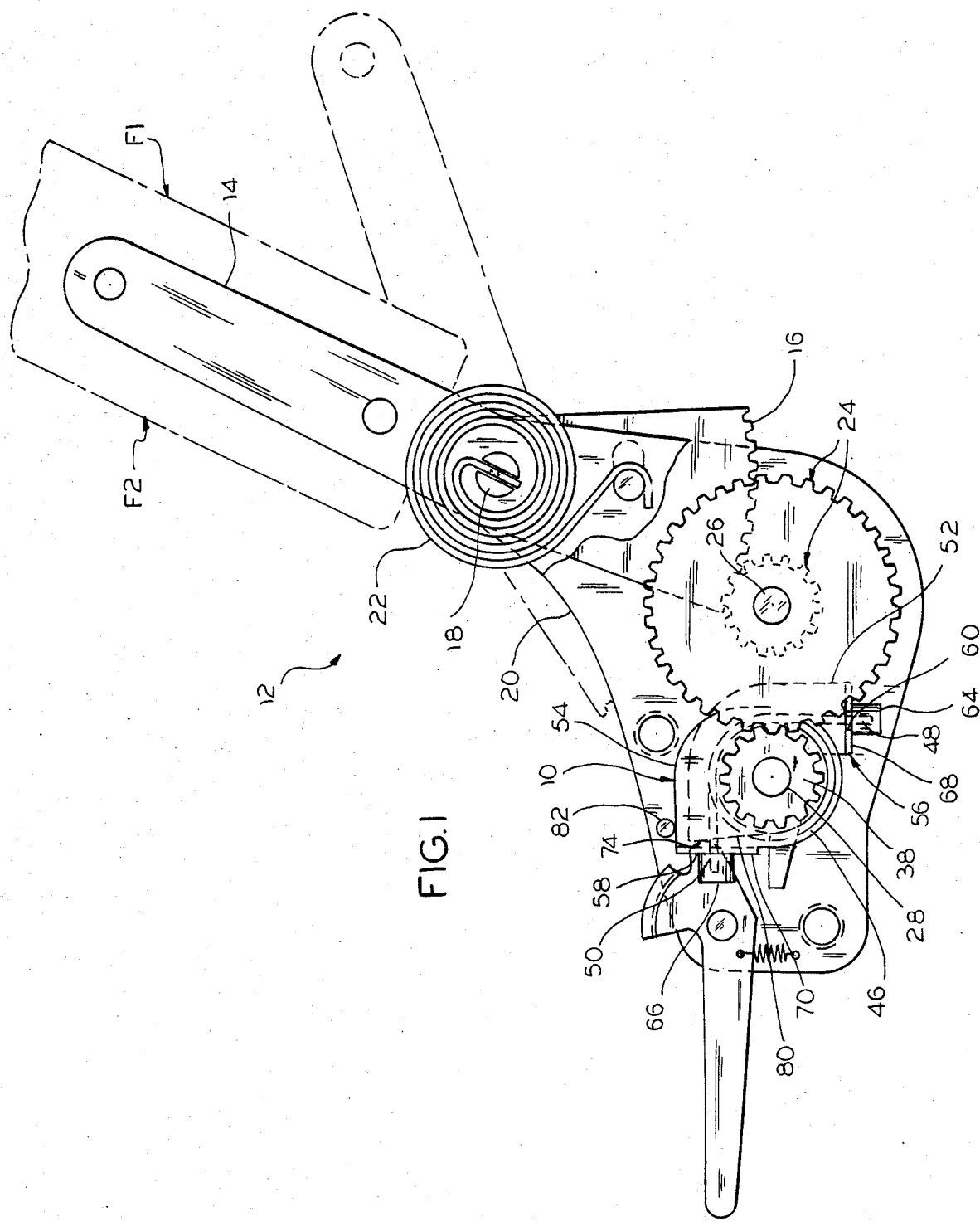
FIG. 1 is a side elevation of a preferred embodiment of the clutch mechanism of the invention for use in an automotive reclining seat assembly showing details of construction and operation in the engaged position of the clutch.

The present invention is directed to a spring clutch mechanism 10 and, while the invention has been described in use as for controlling the operation of an automotive-type reclining seat back, it is to be understood that it can be used to control any member where positioning and retention at any of an infinite number of angular positions of a pivotable member is required and where equal ability to retain the member against movement in each of opposite directions of movement due to external forces on the member is required.

Referring to FIGS. 1 and 3, there is shown a reclining seat mechanism 12 including a seat back mounting bracket 14 to which a seat back, shown in phantom outline in FIG. 1, is mounted. The mounting bracket is provided with a sector gear 16 which is caused to rotate in response to pivotable movement of the bracket 14 about a pivot pin 18 carried on a pair of frame rails 30, 32, of the seat mechanism 12.

Typically, a seat back return assist spring 22 is provided to automatically bias the seat back toward the upright position as shown in FIG. 1.

Pivotable motion of the seat back bracket 14 and translation of external forces $F_1$, $F_2$ acting on the seat back bracket are converted to rotory motion and torsional forces $T_1$, $T_1$ respectively, at the clutch mechanism 10 by a gear set 24 mounted to the frame rails 30, 32 such as with a pin 26.

Still referring to FIGS. 1 and 3, and also to FIG. 2, the clutch mechanism 10, which is the subject of the present invention, is mounted to the frame of the assembly 12 on another pin 28 also extending between the parallel spaced-apart frame rail members 30, 32. It is to be understood that the specific mounting structure of the clutch to the frame does not constitute part of the present invention, and it is contemplated that many mounting structures are possible. For example, the pin 28 could be cantilevered from a single rail rather than sandwiched between two parallel rails as shown.

A gear piece having a clutch gear 38 is mounted for rotation on the mounting pin 28. As shown best in FIG. 3, the gear piece includes a circular projection 40 having a co-axial bore 42 within which the pin 28 is rotatably received. Preferably, the bore 42 defines a bearing surface providing for rotation of the gear piece 36 on the pin 28 without the necessity to provide any other bearing surface. According to the embodiment shown in the drawings, a clutch spindle 44 is defined by the outer periphery of the circular projection 40 of the gear piece and rotates with the gear piece. The clutch gear 38 is engaged to the gear set 24, as set out hereinabove, and it can be seen that the spindle 44 will thereby alternatively rotate in a first direction, as indicated by the arrow $T_1$ in FIG. 1, in response to pivotal movement of the seat back bracket 14 in a first direction toward the fully upright position under the influence of the force $F_1$ and in a second direction, as indicated by the arrow $T_2$ in FIG. 1, in response to pivotal movement of the seat back bracket 14 in a second direction toward the reclined position under the influence of the force $F_2$.

A torsional coil spring 46 having at least one coil is mounted around the clutch spindle 44 and has two angularly spaced-apart free ends 48, 50. The spring preferably is made from flat spring-wire and is wound with adjacent surfaces of the coils in intimate contact. The inside diameter of the wound spring coils is dimensioned such that the clutch spindle fits slidably, co-axially within the coils and is just free to rotate therein with the spring in its normal at rest, untensioned position. The clutch so defined provides for free rotation of the spindle within the spring coils when the spring is untensioned and for frictional retention of the spindle against rotation when the spring is tensioned. The frictional retention occurs due to the slight reduction in the coil inside diameter of the spring as it is tensioned, thereby frictionally engaging the spindle 44.

Heretofore, as set out in the background section hereinabove, spring clutches have had high holding power in only one direction of application of torsional force thereto. This is true because, as shown in FIGS. 4 and 5, for these spring clutches to function, one of the free ends of the spring, such as 48 in FIG. 4, must be restrained against movement and the other free end 50 allowed to move when a torsional force is exerted on the spring in the direction indicated as $T_1$ in FIG. 4. Further, the end that must be restrained and the end that must be allowed to move is dependent on the direction of application of the force as shown in FIGS. 4 and 5 such that the spring will be maintained in tension. As noted heretofore, one clutch spring could efficiently restrain the spindle under the influence of forces applied in only one direction.

As shown in FIGS. 4 and 5, the principle of the present invention is concerned with providing means for maintaining the clutch spring 46 in tension regardless of the direction of application of the torsional force thereon.

As shown in FIG. 4, this requires providing means for restraining the first free end 48 and allowing the second free end 50 to be movable under the influence of a first torsional force $T_1$ such as that generated due to the force $F_1$ applied to the seat mounting bracket 14, and conversely, as shown in FIG. 5, means must also be provided for restraining the second end 50 and allowing movement of the first end 48 under the influence of an oppositely directed second torsional Force $T_2$, such as that generated by the force $F_2$ applied to the seat back bracket 14 in a direction opposite to that of the force $F_1$.

The preferred embodiment accomplishes this by providing a first spring plate 52 which is pivotably mounted on the pin 28 on one side of the spring 46 and a second spring plate 54 which is also pivotably mounted on the pin 28 on the opposite side of the spring. Each spring plate includes a tab-like projection 56, 58 provided with a slot 60, 62 through which the ends 48, 50 of the spring are slidably received. Each spring end 48, 50 is provided with an enlargement 64, 66 positioned against the outboard surfaces 68, 70 of the respective projection 56, 58. As shown in FIG. 6, the enlargements are affixed to the ends of the springs such as by casting the spring ends within a bead of, for example, metal. This attachment is representative only and other methods can be devised by those skilled in the art.

It can be seen that the slots and enlargements provided for generally axial movement of the respective ends 48, 50 of the spring within the slots in only one direction, and further, only in that direction for increasing the tension of the spring.

As shown in FIG. 2, the first spring plate 52 is provided with a first cam surface 72 which is contacted by a cam actuator 74 on a pivotable lever arm 76. The lever 76 is also provided with a stop surface 78 that contacts the projection 58 on the spring plate 54 preventing its rotation when the actuator 74 is engaged to the cam surface 72. In this, the released position of the lever arm and clutch, the spring plate 52 is rotated in the counterclockwise direction, as viewed in FIGS. 1 and 2, thereby also slightly rotating the spring end 48 counterclockwise. Because the spring plate 54 is restrained by the stop surface 78, the spring coil is slightly uncoiled reducing its tension and thereby releasing the frictional engagement of the spring from the spindle 44. The spindle is then freely rotatably and the seat back bracket 14 can be positioned to any angular position desired.

Still referring to FIGS. 1 and 2, the spring plate 52 is also provided with a second cam surface 80 which is contacted by the cam actuator 74 in the engaged position of the lever and clutch, as shown in FIG. 1. A second stop, in the form of a pin 82, on the frame engages the spring plate 54 in the engaged position preventing rotation of the spring plate 54 in the clockwise direction, as viewed in FIGS. 1 and 2. With the actuator 74 engaged to the cam surface 80 and the spring plate 54 restrained, the spring plate 52 is caused to rotate slightly in the clockwise direction as viewed in FIGS. 1 and 2 due to the ramp on the cam surface 80. The enlargement 66 on the spring end 50 engages against the projection 58 and restrains that end 50 of the spring from moving. Further clockwise rotation of the spring plate 52 causes the projection 64 on the spring end 48 to engage against the surface 68 of the projection 56 thereby causing the spring to also slightly rotate clockwise so as to increase its tension and frictionally engage the spindle and hold the seat back bracket 14 at the desired selected position.

The unique means of retaining the spring ends 48, 50 to the spring plates 52, 54 and the cooperation of the stop members with the spring plates provides for maintaining the clutch spring in tension when in the engaged position regardless of the direction of application of torsional forces thereon.

By way of example of the operation of the clutch in the engaged position, in response to the force $F_1$ exerted on the bracket 14, a torsional force $T_1$, is exerted on the clutch spindle 44 which is transmitted to the clutch spring in a counterclockwise direction as viewed in the drawings. The enlargement 64 is pulled against the surface 68 of the projection 56 by the torsional force $T_1$ and, because the spring plate 52 is prevented from rotating in the counterclockwise direction by the cam actuator 74 abutting the second cam surface 82, the spring end 48 is thereby restrained against movement. However, the opposite end 50 of the spring is unrestrained in the counterclockwise direction because the enlargement 66 thereon is positioned adjacent to the outboard surface 70 of the projection 58. The spring end 50 is, therefore, free to move slightly within the slot 62. It can be seen that the spring is thereby always in tension.

Similarly, in response to the Force $F_2$ on the bracket 14, a torsional force $T_2$ is exerted on the clutch spindle 44 which is transmitted to the clutch spring in a clockwise direction as viewed in the drawings. In this case, the enlargement 66 on the spring end 50 is pulled against the surface 70 of the projection 58 and, because the spring plate 54 is now prevented from rotating clockwise by the stop pin 82, the spring end 50 is thereby restrained against movement. However, the end 48 of the spring is now unrestrained in the clockwise direction because the enlargement 64 thereon is positioned adjacent to the outboard surface 68 of the projection 56. The spring is, therefore, free to move slightly within the slot 60 and it can be seen that the spring is again always in tension. The inventive clutch mechanism provides for equal holding power of the clutch in all directions as well as for infinite adjustment for position.

Having described the preferred embodiment of the invention and its operation, those skilled in the art can readily devise other modifications and embodiments having the benefit of the description and drawings. Therefore, said modifications and embodiments are to be considered to be within the scope of the appended claims.

What is claimed is:

1. A spring clutch mechanism for controlling pivotal motion of a member between a first angular position and a second angular position and for releasably retaining said member at any of an infinite number of intermediate angular positions between said first angular position and said second angular position against application of a first force applied to said member toward said first angular position and against application of a second force applied to said member toward said second angular position comprising:

spring clutch means including one torsion spring having at least one spring coil, a first end and a second end of said spring in angularly spaced apart relationship, spindle means mounted for rotation within said spring coil about an axis coaxial with said spring coil including means operatively connected to said member for rotating said spindle means in a first direction in response to movement of said member toward said first angular position and in a second direction opposite to said first direction in response to movement of said member toward said second angular position, said spring coil adapted to frictionally engage and restrain said spindle against said rotation when tension thereof is increased and to disengage and allow said spindle to rotate when tension thereof is released;

means for selectively reducing the tension of said spring coil defining a released position of said clutch means providing for said disengagement of said spring coil from said spindle and said rotation of said spindle;

means for selectively increasing the tension of said spring coil to a magnitude providing for said frictional engagement and restraint of said spindle defining an engaged position of said clutch means; and means for maintaining said spring coil in tension when under the influence of torsional forces transmitted thereto from said spindle means in the engaged position and acting in either of said first and said second directions of rotation of said spindle means in response to said torsion forces exerted on said spindle means in response to the application of one of said first force and said second force to said member.

2. The spring clutch mechanism as defined in claim 1, wherein said means for maintaining said spring in tension includes means for restraining said first end of said spring against axial movement thereof and simultaneously providing for movement of said second end of said spring under the influence of said torsional force applied to said spring coil in said first direction of rotation; and means for restraining said second end of said spring against axial movement thereof and simultaneously providing for movement of said first end of said spring under the influence of said torsional force applied to said spring in said second direction of rotation.

3. The spring clutch mechanism as defined in claim 2, wherein said means for reducing the tension of said spring coil and said means for increasing the tension of said spring coil includes lever operated cam means operatively connected to said first end and said second end for selectively increasing the angular spacing therebetween so as to uncoil the spring coil and decreasing the angular spacing therebetween so as to tighten said spring coil.

4. The spring clutch as defined in claim 3, wherein said lever operated cam means includes, a first spring plate on one side of said spring including means for retaining said first end of said spring thereto, said first spring plate mounted for pivotable motion about the axis of rotation of said spindle means and including a first cam surface and a second cam surface;

a second spring plate on a second side of said spring opposite said first side including means for retaining said second end of said spring thereto;

a lever mounted for pivotable motion between said engaged and said released positions including cam actuating means adapted to engage said first cam surface in said release position to rotate said first spring plate and said spring first end to uncoil said spring coil, said cam actuating means further adapted to engage said second cam surface in said engaged position to rotate said first spring plate and said spring first end in a direction to tighten said spring coil.

5. The clutch mechanism as defined in claim 4, wherein said second spring plate is rotatable about the axis of rotation of said spindle means and said lever includes first stop means adapted to engage said second spring plate in the released position to prevent rotation of said second spring plate in said first direction of rotation.

6. The clutch mechanism as defined in claim 5, wherein said clutch mechanism further comprises:

second stop means adapted to engage said second spring plate in the engaged position to prevent rotation of said second spring plate in said second direction opposite to said first direction.

7. The clutch mechanism as defined in claim 6, wherein said cam actuating means defines third stop means engaging said first spring plate in the engaged position to prevent rotation of said first spring plate in said first direction of rotation.

8. The clutch mechanism as defined in claim 7, wherein said means for restraining said first end of said spring coil and simultaneously providing for axial movement of said second end and said means for restraining said second end and simultaneously providing for movement of said first end includes first slot means in said first spring plate, said first end of said spring coil slidably received therein, said means for restraining said first end including a first enlarged portion on said first end received against said first spring plate at said first slot means preventing movement of said spring in said first slot means in the first direction of rotation of said spindle means and providing for movement thereof in said first slot means in said second direction of rotation of said spindle; and second slot means in said second spring plate, said second end of said spring coil slidably received in said second slot means, said means for restraining said second end includes a second enlarged portion on said second end of said spring coil received against said second spring plate at said second slot means preventing movement of said spring in said second slot means in said second direction of rotation of said spindle means and providing for movement thereof in said second slot means in said first direction of rotation of said spindle means.

9. A spring clutch mechanism for controlling an external member pivotable between first and second angular positions comprising:

spindle means including gear means adapted to be operatively connected to said external member for rotation of said spindle means in first and second directions of rotation and for transmitting torsional forces to said spindle in said first and said second direction of rotation in response to pivotal movement of said member and application of external forces to said member;

torsional coil spring means mounted around said spindle means for selective frictional engagement and disengagement of said spindle means, said spring means includes first and second ends;

means for mounting said first and second ends for alternative selective movement angularly toward and away from each other to increase and decrease tension in said spring means providing for said frictional engagement and disengagement thereof with said spindle means;

said means for mounting said first and second ends including means providing for restraint of said first end against movement and movement of said second end under the influence of said torsional force applied to said spindle means in the first direction of rotation when said spring is engaged to said spindle means; and said means for mounting said first and second ends further including means providing for restraint of said second end against movement and for movement of said first end under the influence of said torsional force applied to said spindle means in the second direction of rotation when said spring is engaged to said spindle means.

* * * * *